United States Patent [19]

Cristofano et al.

[11] Patent Number: 5,244,611
[45] Date of Patent: Sep. 14, 1993

[54] METHOD FOR THE VECTORIAL ASSEMBLY OF GREEN TIRES IN A CURING MOLD

[75] Inventors: Marino Cristofano; Diego Minaudo, both of Rome, Italy

[73] Assignee: Bridgestone Corporation, Tokyo, Japan

[21] Appl. No.: 786,679

[22] Filed: Nov. 1, 1991

[30] Foreign Application Priority Data

Dec. 21, 1990 [IT] Italy ................................ 68043 A/90

[51] Int. Cl.⁵ ........................ G06F 15/46; B29C 35/02
[52] U.S. Cl. ................................... 264/40.2; 264/315;
264/326; 364/473; 364/552; 425/38; 425/135
[58] Field of Search ................ 264/40.7, 297.5, 326,
264/315, 40.1, 40.2; 425/29, 38, 135; 414/222,
225; 198/349.6; 364/473, 552

[56] References Cited

U.S. PATENT DOCUMENTS

| | | | |
|---|---|---|---|
| 3,659,974 | 5/1972 | Neugroschl | 425/29 |
| 4,268,219 | 5/1981 | Nakagawa et al. | 414/222 |
| 4,728,274 | 3/1988 | Siegenthaler | 425/38 |
| 4,747,765 | 5/1988 | Siegenthaler et al. | |
| 4,773,810 | 9/1988 | Nishimura et al. | 198/349.6 |
| 4,778,060 | 10/1988 | Wessner, Jr. | 425/29 |
| 4,824,349 | 4/1989 | Oku et al. | 425/29 |
| 4,881,882 | 11/1989 | Fantacci | 425/38 |
| 4,993,906 | 2/1991 | Nisimura et al. | 414/222 |

FOREIGN PATENT DOCUMENTS

| | | | |
|---|---|---|---|
| 99326 | 1/1984 | European Pat. Off. | 425/38 |
| 60-230835 | 7/1985 | Japan . | |
| 60-187539 | 10/1985 | Japan . | |
| 62-256613 | 6/1987 | Japan . | |

OTHER PUBLICATIONS

Database WPIL, accession No. 87-352512 [50], Derwent Publications Ltd., London, GB; and JP-1-62 256 613 (Bridgestone Tire K.K.) Sep. 11, 1987.
Patent Abstracts of Japan, vol. 10, No. 33 (M-452) [2090], Feb. 8, 1986; JP-A-60 187 539 (Kawatsune Shiyouten K.K.) 25-09-185 *Abstract; figures*.
Patent Abstracts of Japan, vol. 10, No. 92 (M-468) [2149], Apr. 9, 1986; JP-A-60 230 835 (Bridgestone K.K.) Nov. 16, 1965 *Abstract; figures*.

Primary Examiner—Jeffery Thurlow
Assistant Examiner—Mathieu Vargot
Attorney, Agent, or Firm—David A. Thomas

[57] ABSTRACT

A method for the vectorial assembly of green tires (2) in a curing unit (4), whereby a processing unit (12), after performing a first step consisting in determining the origin of a tire (2), i.e. the machine on which it was produced, and the curing unit (4) in which it is to be cured, extracts memorized data relative to the asymmetry of the curing unit (4) and the average tire (2) produced on the machine, and positions the tire (2) angularly in relation to the curing unit (4) so as to compensate for both asymmetries according to a given program.

3 Claims, 2 Drawing Sheets

METHOD FOR THE VECTORIAL ASSEMBLY OF GREEN TIRES IN A CURING MOLD

TECHNICAL FIELD

The present invention relates to a method for the vectorial assembly of green tires in a curing mold.

BACKGROUND OF THE ART

In recent times, the tire manufacturing industry has registered a substantial breakthrough in eliminating both radial and axial asymmetry. In actual practice, however, a tire with substantially no axial or radial asymmetry vectors must naturally be considered a purely random achievement in that, like any machine, a green tire manufacturing machine inevitably introduces predominantly systematic errors, mainly due to the geometry of the machine and the type of operation being performed.

Regardless of the machine, however, it is usually possible to detect statistically a definite radial or axial asymmetry vector characterizing, on average, substantially all the tires produced by the same machine. In addition, the curing mold to which the tire is usually assigned in purely random manner also presents an asymmetry marked by a definite vector and is responsible for yet a further manufacturing error or deviation.

SUMMARY OF THE INVENTION

The aim of the present invention is to provide a method of assembling green tires in curing molds, in such a manner as to minimize the asymmetry detectable in the cured tire. With this aim in view, according to the present invention, there is provided a method for the vectorial assembly of green tires in a curing unit, characterized by the fact that it comprises a first step performed by a processing unit for determining both the origin of said green tire, i.e. the machine on which it was produced, and the curing unit to which it is assigned; a second step wherein said processing unit extracts memorized data relative to the asymmetry of both said curing unit and the average tire produced by said machine; and a third step wherein said tire is positioned angularly inside said curing unit in such a manner as to compensate at least partially for said asymmetries according to a given program for said processing unit.

BRIEF DESCRIPTION OF THE DRAWINGS

A non-limiting embodiment of the present invention will now be described by way of example with reference to the accompanying drawings, in which.

BEST MODE FOR CARRYING OUT THE INVENTION

Figure 1:
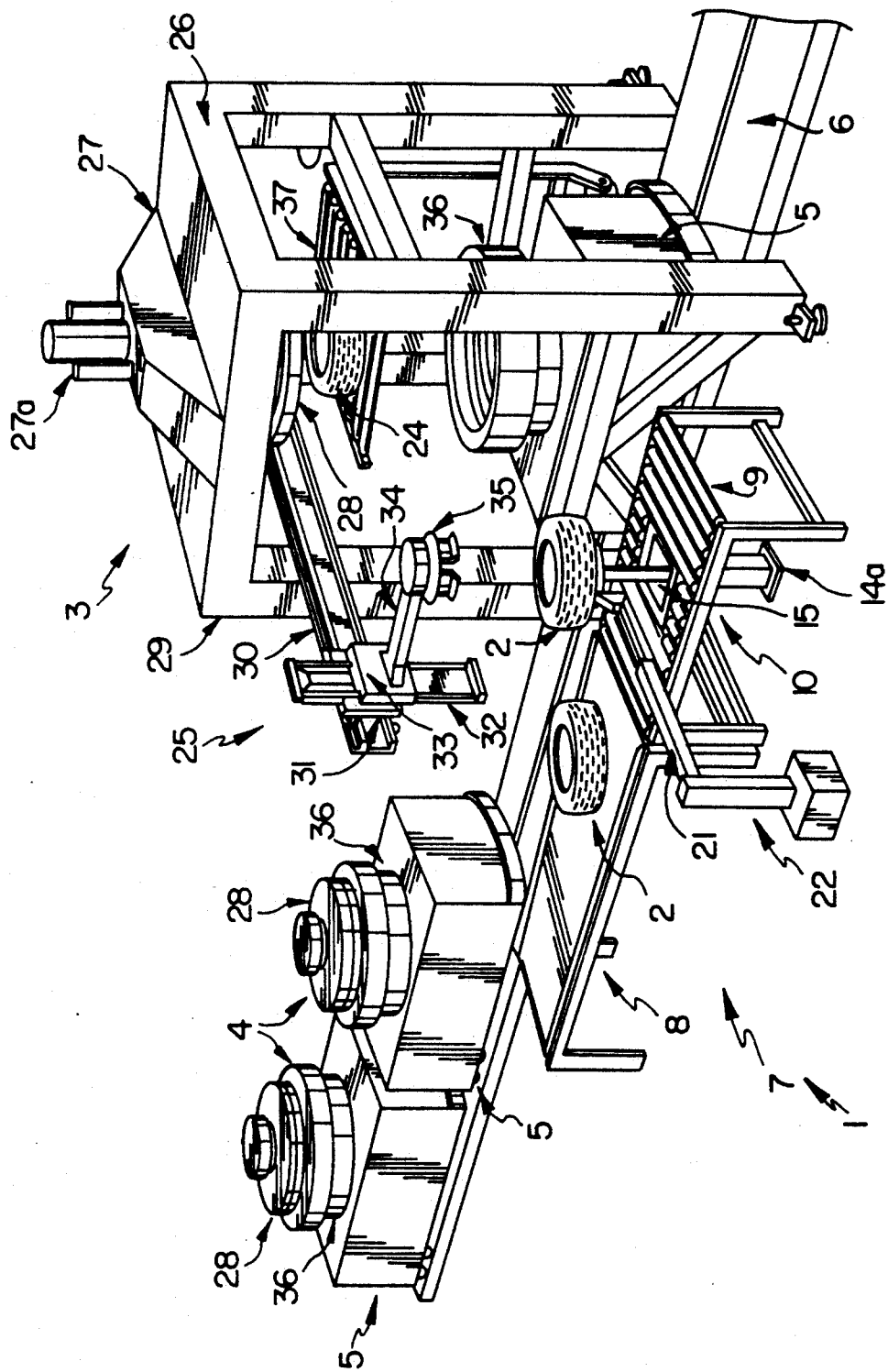
FIG. 1 shows a view, in perspective, of a device for feeding and assembling tires inside a curing mold and implementing the method according to the present invention.

Number 1 in FIG. 1 indicates a device for feeding green tires 2 into a station 3 for opening and closing curing units 4 fed successively into station 3 on respective carriages 5 traveling along a line 6 extending through station 3. Curing units 4 are preferably of the type described and illustrated in U.S. Pat. No. 4,747,765, the content of which is fully incorporated herein in the interest of full disclosure.

Figure 2:
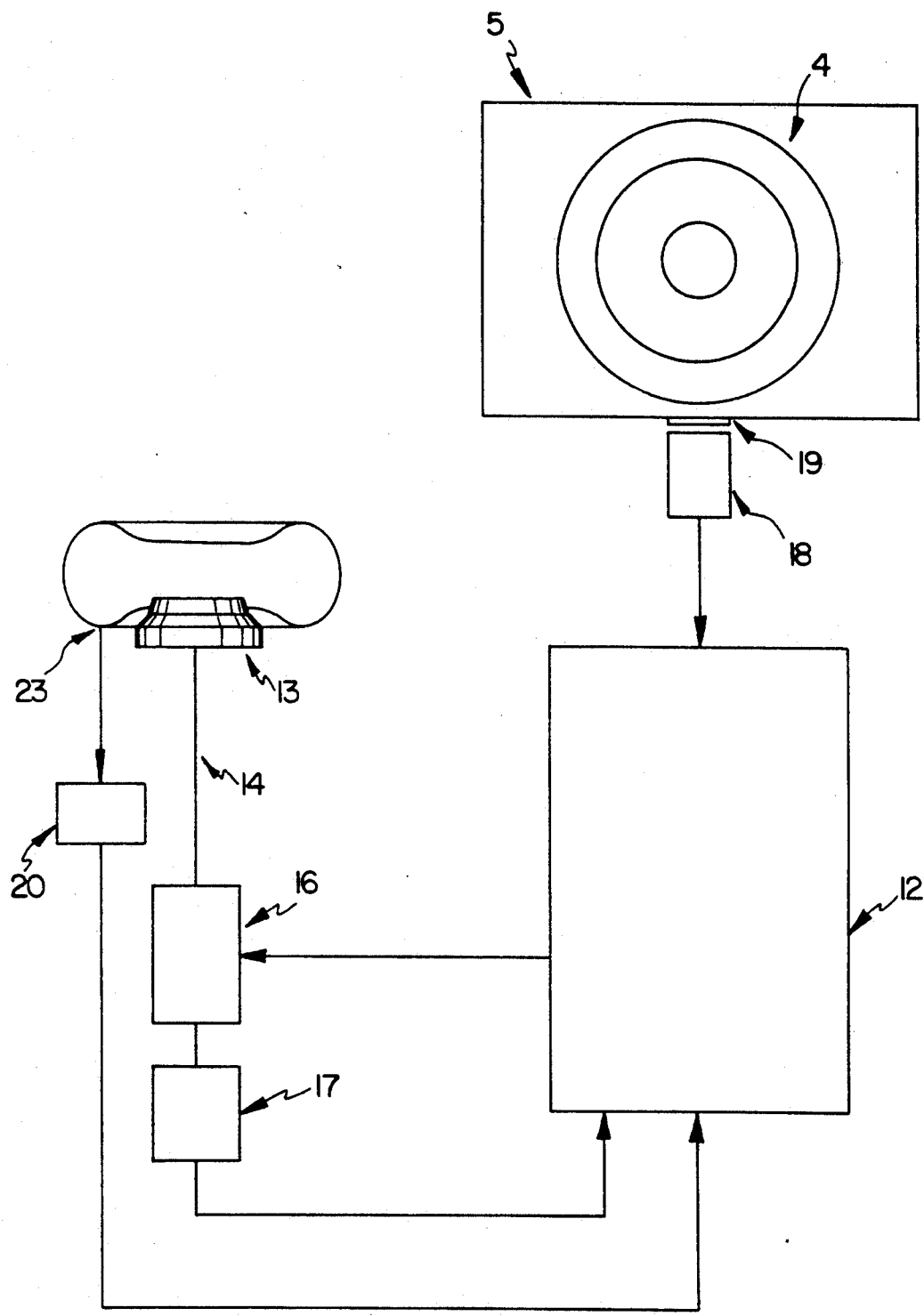
FIG. 2 shows a schematic, partial block diagram of a part of the FIG. 1 device.

Device 1 includes an input conveyor 7 located between station 3 and a machine (not shown) for forming tires 2. In particular, conveyor 7 includes a conveyor belt 8 for feeding tires 2 onto a roller conveyor 9 to the side of station 3 and supported at a given height on a base frame 10. Roller conveyor 9 forms a portion of a tire positioning unit 11, a block diagram of which is shown in FIG. 2. With reference to FIG. 2, positioning unit 11 comprises a data processing unit 12, normally consisting of an electronic computer designed to memorize or store the radial and axial asymmetry vectors of both the average tire produced on each of the tire building machines (not shown) connected to conveyor 8, and each curing unit 4 assignable to station 3.

Unit 11 also includes a substantially truncated-cone-shaped platform 13 fitted on to the top end of a shaft 14 designed to move axially, by virtue of a linear actuator 14a (FIG. 1) and through an opening 15 formed in roller conveyor 9, between a lowered idle position, wherein platform 13 is at most on a level with roller conveyor 8, and a raised operating position wherein platform 13 is located above roller conveyor 9. Shaft 14 is connected to the output of a preferably stepping type of motor 16 for rotating platform 13 about its axis by angles measurable by an encoder 17 connected to shaft 14.

Processing utilizes a first reader 18 for reading an identification plate 19 on each carriage 5 and relative to the curing unit 4 carried on same. Reader 18 thus provides for transmitting to unit 12 information for identifying said unit 4, and so enabling unit 12 to assign a respective memorized radial and axial asymmetry vector to each unit 4 entering station 3. Unit 12 also utilizes a second reader 20, consisting of a photocell, located, on the FIG. 1 device, on the end of an arm 21 designed, via a linear actuator 22, to move reader 20 radially in relation to shaft 14 and to and from a reading position wherein reader 20 faces the lower lateral wall of a tire 2 located on platform 13 in its raised operating position.

Reader 20 provides for reading an identification marker 23 located, in the example shown, on the lower lateral wall of each tire 2 and indicating its "origin", i.e. the machine (not shown) on which tire 2 was produced. Reader 20 thus provides for transmitting to unit 12 information for identifying the "origin" of each tire 2, and so enabling unit 12 to assign a memorized mean radial and axial asymmetry vector to each tire 2 on raised platform 13.

In actual use, as each tire 2 is fed along conveyor 7, it is examined and its "origin" determined by reader 20. In the example shown, said "origin" is determined when tire 2, upon reaching opening 15, is raised on platform 13 and rotated about the axis of shaft 14 so as to feed marker 23 past reader 20 in the reading position. Upon reading marker 23, reader 20 supplies unit 12 with a signal enabling it to retrieve, from memorized or stored mean radial and axial asymmetry vectors, those relative to tire 2 in question, and the position of these vectors in relation to an origin or base line which is shifted by a given angle, possibly zero, in relation to the position of identification marker 23 on tire 2. At the same time, reader 18 has identified a curing unit 4 fed into station 3 to receive tire 2 in question, and enabled unit 12 to retrieve, from memorized mean radial and axial asymmetry vectors, those relative to said unit 4, and the position of these vectors in relation to an origin or base line located at a given point along unit 4.

Supplied with the above data, unit 12 provides for determining, according to a given program, the angle by which tire 2 must be rotated, commencing from the position wherein marker 23 is arranged facing reader 20, for it to be loaded into unit 4 at such an angle as to enable the production of a finished tire 24 in which the asymmetry of tire 2, on the one hand, and respective unit 4, on the other, is at least partially compensated on the basis of minimum functions dictated by said program.

Angular positioning of tire 2 as required by platform 13 is controlled in known feedback manner by encoder 17. Once rotated into the required position, tire 2 is gripped by a transfer device 25 and loaded into the open unit 4 in station 3. Both device 25 and station 3 may be designed in various ways. In the FIG. 1 example, station 3 is similar to the one described and illustrated in US Pat. No. 4,728,274, the content of which is fully incorporated herein in the interest of full disclosure.

Station 3 is defined by a gantry type structure 26 having a top wall 27 supporting a mechanism 27a for lifting the upper half mold 28 of unit 4, and a pillar 29 supporting a transverse slideway 30 of device 25. In the example shown, device 25 also includes a slide 31 traveling along slideway 30 and supporting a further slideway 32, perpendicular to slideway 30, fitted with yet a further slide 33 supporting an arm 34 connected at its free end to a known pickup head 35 for tires 2. Device 25 is so arranged so as to move head 35 between a pickup position coaxial with tire 2 on conveyor 7, and a release position over and coaxial with the lower half mold 36 of unit 4 in station 3.

In the example shown, station 3 also utilizes an unloading platform 37 designed to move between an idle position outside structure 26, and an operating position between open half molds 28 and 36.

In actual use, on entering station 3, each unit 4 is opened by lifting off upper half mold 28 to which finished tire 24 is initially connected. Once unit 4 has been opened, platform 37 is moved between half molds 36 and 28 to receive tire 24, which is detached in a known manner from half mold 28 by device 27a. At the same time, pickup head 35 grips a tire 2, after having been set to the required angular position by unit 11, and feeds it, still in this position, into half mold 36. Platform 37 is then extracted from structure 26 to enable closure of unit 4 and commencement of the next curing cycle.

From the foregoing description and the operational discussion, when read in light of the several drawings, it is believed that those familiar with the art will readily recognize and appreciate the novel concepts and features of the present invention. Obviously, while the invention has been described in relation to only a limited number of embodiments, numerous variations, changes, substitutions and equivalents will present themselves to persons skilled in the art and may be made without necessarily departing from the scope and principles of this invention. As a result, the embodiments described herein are subject to various modifications, changes and the like without departing from the spirit and scope of the invention with the latter being determined solely by reference to the claims appended hereto.

We claim:

1. A method for the angular positioning of a green tire in a curing unit comprising the steps of:
   determining from a data processing unit the machine on which the green tire was produced and the curing unit to which it is assigned;
   extracting from the processing unit stored data relating to the asymmetry of both said curing unit and the average tire produced by said machine; and
   positioning the green tire angularly by rotating the green tire inside the curing unit in such a manner as to compensate at least partially for said asymmetries according to a given program in said processing unit.

2. A method as claimed in claim 1 in which an origin of each said green tire is determined by reading a marker affixed to said tire during manufacture.

3. A method as claimed in claim 1 in which said angular positioning is performed by supporting said tire on a platform rotated about its axis by a motor controlled by said processing unit and is feedback-controlled via an encoder.

* * * * *